US012334281B2

(12) United States Patent
Knoerrchen

(10) Patent No.: US 12,334,281 B2
(45) Date of Patent: Jun. 17, 2025

(54) CONTROL AND SIGNALING DEVICE AND ADAPTER FOR A CONTROL AND SIGNALING DEVICE

(71) Applicant: Eaton Intelligent Power Limited, Dublin (IE)

(72) Inventor: Oliver Knoerrchen, Cologne (DE)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 18/003,009

(22) PCT Filed: Jun. 24, 2021

(86) PCT No.: PCT/EP2021/067293
§ 371 (c)(1),
(2) Date: Dec. 22, 2022

(87) PCT Pub. No.: WO2022/002739
PCT Pub. Date: Jan. 6, 2022

(65) Prior Publication Data

US 2023/0260722 A1 Aug. 17, 2023

(30) Foreign Application Priority Data

Jun. 25, 2020 (DE) .................... 10 2020 116 718.0

(51) Int. Cl.
*H01H 13/20* (2006.01)
*H01H 13/04* (2006.01)
*H01H 13/14* (2006.01)

(52) U.S. Cl.
CPC ........... *H01H 13/20* (2013.01); *H01H 13/04* (2013.01); *H01H 13/14* (2013.01)

(58) Field of Classification Search
CPC ........ H01H 13/20; H01H 13/04; H01H 13/14; H01H 3/38; H01H 3/42; H01H 3/48;
(Continued)

(56) References Cited

U.S. PATENT DOCUMENTS

| | | | | |
|---|---|---|---|---|
| 3,624,330 | A | 11/1971 | Bognar et al. | |
| 2009/0152086 | A1* | 6/2009 | Hisamune | H01H 19/14 200/336 |
| 2014/0233360 | A1* | 8/2014 | Koshoji | H01H 13/06 200/341 |

FOREIGN PATENT DOCUMENTS

| | | | |
|---|---|---|---|
| DE | 10210984 | A1 | 10/2003 |
| DE | 102017113416 | B3 | 6/2018 |

(Continued)

*Primary Examiner* — Lheiren Mae A Caroc
(74) *Attorney, Agent, or Firm* — LEDIG, VOIT & MAYER, LTD.

(57) ABSTRACT

A control and signaling device includes a cylindrical main body with two open ends, an operating element, which is designed for insertion into one of the open ends of the main body and has a switching part that is movable relative to the main body. The device also has a multipartite insert element, which is designed for insertion into the main body for bridging at least one portion of a switching path from the switching part to a contact element arranged at another of the open ends, and has an elastic element, which elastically supports a portion, provided for operating the contact element, of the insert element in such a way that a pressure force of the insert element onto the contact element is limited to a prespecified force range.

11 Claims, 5 Drawing Sheets

(58) Field of Classification Search
CPC .... H01H 3/52; H01H 2221/064; H01H 19/40; H01H 3/12; H01H 3/08; H01H 3/10; H01H 19/02; H01H 19/14; H01H 19/54; H01H 19/60; H01H 19/635; H01H 19/6355; H01H 2221/01
See application file for complete search history.

(56) References Cited

FOREIGN PATENT DOCUMENTS

| | | | |
|---|---|---|---|
| EP | 1884970 | A2 | 2/2008 |
| GB | 1233400 | A | 5/1971 |

* cited by examiner

CONTROL AND SIGNALING DEVICE AND ADAPTER FOR A CONTROL AND SIGNALING DEVICE

FIELD

The present disclosure relates to a control and signaling device which has an operating element, such as a pushbutton or button, and a contact element, such as a microswitch, as well as an adapter for a control and signaling device.

BACKGROUND

Control and signaling devices of the RMQ-Titan@ series of the applicant enable combinations of operating elements with contact elements. For example, RMQ-Titan@ buttons of type M22 are designed for corresponding contact elements of type M22. These contact elements have pre-specified switching paths, such as approximately 5.5 mm, and are designed for forces in the range of approximately 5-10 N.

Use of the operating elements with other contact elements is generally only possible if the contact elements have the pre-specified switching paths and are designed for the specified force range of the corresponding operating element. For example, it is not readily possible to combine a button of the RMQ-Titan@ series M22 with a microswitch since the pre-specified switching path would not be sufficient to operate the microswitch and the specified force range during operation is not suitable for microswitches.

A combination of an operating unit with a microswitch is known from GB 1 233 400 A, which may be used, for example, with a pushbutton body for operating one or more microswitches. However, this is a special design which, for example, cannot readily be combined with, for example, a button of the RMQ-Titan@ series M22 without further structural changes.

U.S. Pat. No. 3,624,330 A describes a switch with a body, a tappet assembly, and a contact assembly, wherein the tappet assembly has a first tappet, a second tappet, a tappet spring and a divider, wherein the first tappet is telescopically engaged with the second tappet, the second tappet is engaged with the divider and is axially movable therein, and the tappet spring is engaged between the first tappet and the divider, wherein the tappet assembly is movably connected to the body, wherein the contact assembly has a fixed contact, a movable 5 contact, and the divider has means for engagement of the movable contact in the contact assembly.

DE 102 10 984 A1 describes a signal lamp for an optical display, comprising a housing with electrical conductor parts, a light-emitting diode in a thrust piece, which has a translucent luminous cap, a hollow rod, in the one end region of which the thrust piece is mounted in an axially displaceable manner, and the other end part of which is arranged in the housing, and an electrical switch, which is arranged in the hollow rod in the longitudinal direction thereof behind the light-emitting diode and can be operated by axial 15 displacement of the pressure piece.

DE 10 2017 113 416 B3 describes a microswitch which consists of a cylindrical sleeve in which a piston is mounted in an axially movable manner. A contact pin is in turn mounted within the piston in an axially movable manner. The contact pin interacts with two mating contacts which are fixed spaced apart from one another in a base of the sleeve. The movement of the contact pin is supported by two springs. A return spring is arranged between the sleeve base and the piston and moves the piston into a starting position when the microswitch is not operated. A damping spring is arranged between the contact pin and an operating cap of the piston and ensures a soft placement of the contact pin on the mating contacts. In order to damp the movement of the contact pin only shortly before a placement on the mating contacts, the damping spring has a higher spring force than the return spring.

SUMMARY

A control and signaling device and an adapter for a control and signaling device are now described below.

According to one aspect, a control and signaling device is disclosed which comprises the following: a cylindrical main body with two open ends, an operating element which is designed for insertion into one of the open ends of the main body and has a switching part movable relative to the main body, and a multipartite insert element which is designed to be inserted into the main body for bridging at least one portion of a switching path from the switching part to a contact element arranged at the other of the open ends and has an elastic element which elastically supports a portion, provided for operating the contact element, of the insert element in such a way that a pressure force of the insert element onto the contact element is limited to a pre-specified force range. Such a control and signaling device enables the shortening of the switching path and of the pressure force on the contact element so that a microswitch that requires a lower contact pressure than a conventional contact element may also be used as a contact element. In particular, a control and signaling device of the RMQ-Titan@ series of the applicant, which is designed for use with conventional contact elements, may be modified by the insert element and the elastic element in such a way that a microswitch may also be used. A modular control and signaling device is therefore provided which may be used with contact elements that require different switching paths and/or 20 contact pressures.

In a first embodiment of the control and signaling device, the switching part is axially movable relative to the main body, wherein the insert element comprises a pin-shaped central part, which forms the portion provided for operating the contact element, and a bracket, which is arranged coaxially with the central part and into which the elastic element can be inserted so that it is arranged coaxially with the central part and can exert a force on the central part, wherein the bracket is fixed in the switching part, and the central part is mounted in the bracket in an axially movable manner and is pressed against a stop in the direction of the contact element by the elastic element arranged coaxially between the bracket and the central part. The first embodiment is provided in particular for a push button as an operating element which is moved axially in the main body in order to operate the contact element.

In the first embodiment of the control and signaling device, the bracket may have a base and a plurality of finger-shaped retaining rods extending from the base approximately parallel to the central part, wherein the base has an opening approximately in its center for the central part to pass through, and the edge region of the opening in the base forms the stop for a radial projection of the central part. Such a base may, for example, be produced in one piece as a molded part. It also enables a simple assembly of the control and signaling device since the central part only has to be guided through the opening in the base of the bracket and the elastic element may be slipped, for example, in the form of a cylinder open on both sides, onto the central part so that it is arranged between the finger-shaped retaining rods and the central part.

In the first embodiment of the control and signaling device, the switching path may be approximately 5 mm and, in the state where it is pressed up to the stop, the central part may project from the bracket far enough that the switching path is shortened to approximately 1 mm. Such a switching path is 20 required specifically when using an RMQ-Titan@ button of type M22 with a microswitch.

Furthermore, in the first embodiment of the control and signaling device, the elastic element may be a helical compression spring which is designed in such a way that its pressure force in the compressed state is approximately in the pre-specified force range. A helical compression spring is advantageous since it is durable and, moreover, the pressure force may be adjusted relatively precisely by a suitable choice of the parameters of the spring.

In the second embodiment of the control and signaling device, the switching part is rotationally movable relative to the main body, wherein the insert element has a central part, which is axially movable relative to the main body by a rotation of the switching part in the main body, and a pressure part, which forms the portion provided for operating the contact element and is mechanically coupled to the central part in such a way that an axial movement of the central part relative to the main body causes a corresponding axial movement of the pressure part, and wherein the pressure part is pressed against a stop in the direction of the contact element by the elastic element fixed to the central part. The second embodiment is provided in particular for a rotary button as an operating element which is moved rotationally in the main body in order to operate the contact element.

In the second embodiment of the control and signaling device, the switching part can have a sliding surface with a predetermined angle in relation to the axis of rotation of the switching part and the central part can have a corresponding mating sliding surface, as a result of which the sliding surface slides on the mating sliding surface during a rotation of the switching part and thereby causes the axial movement of the central part relative to the main body. In this way, a conversion of the rotation of the switching part into a translation of the central part can be implemented with relatively few means. In addition, the use of pressure contact switches such as microswitches is 20 made possible.

In a further development of the second embodiment of the control and signaling device, the switching path may be approximately 5 mm and, in the state where it is pressed up to the stop, the pressure part projects far enough beyond the other of the open ends of the main body that the switching path is shortened to approximately 1 mm. Such a switching path is required specifically when using an RMQ-Titan@ button of type M22 with a microswitch.

According to a further development of the second embodiment of the control and signaling device, the elastic element may be a leaf spring which is designed in such a way that its pressure force in the bent state is approximately in the pre-specified force range. The leaf spring may in particular be manufactured from a spring steel. A leaf spring may be mounted relatively easily, for example fastened, in particular clamped, at one end to the central part so that its other end can press on the pressure part and exert a contact pressure thereon.

According to a further aspect, an adapter for a control and signaling device is disclosed which has a cylindrical main body with two open ends and an operating element which is designed for insertion into one of the open ends of the main body and a switching part movable relative to the main body, wherein the adapter comprises the following: a multipartite insert element which is designed for insertion into the main body for bridging at least one portion of a switching path from the switching part to a contact element arranged at the other of the open ends and has an elastic element, which elastically supports a portion, provided for operating the contact element, of the insert element with respect to the switching part in such a way that a pressure force of the insert element on the contact element is limited to a pre-specified force range. Such an adapter may be used, for example, to extend the range of use of control and signaling devices of the RMQ-Titan@ series since it enables use with a greater selection of contact elements.

In a first embodiment, the adapter is provided for a control and signaling device in which the switching part is axially movable relative to the main body. In the first embodiment of the adapter, the insert element comprises a pin-shaped central part, which forms the portion provided for operating the contact element, and a bracket, which is arranged coaxially with the central part and into which the elastic element can be inserted so that it is arranged coaxially with the central part and can exert a force on the central part, wherein the bracket can be fixed in the switching part, and the central part is mounted in the bracket in an axially movable manner and is pressed against a stop in the direction of the contact element by the elastic element arranged coaxially between the bracket and the central part. The first embodiment of the adapter is provided in particular for use in a push button as an operating element which is moved axially in the main body in order to operate the contact element.

In a second embodiment, the adapter is provided for a control and signaling device, in which the switching part is rotationally movable relative to the main body. In the second embodiment of the adapter, the insert element comprises a central part, which is axially movable relative to the main body by a rotation of the switching part in the main body, and a pressure part, which forms the portion provided for operating the contact element and is mechanically coupled to the central part in such a way that an axial movement of the central part relative to the main body causes a corresponding axial movement of the pressure part, and wherein the pressure part is pressed against a stop in the direction of the contact element by the elastic element fixed to the central part. The second embodiment of the adapter is provided in particular for use in a rotary button as an operating element, which is moved rotationally in the main body in order to operate the contact element.

Further features result from the following description in connection with the exemplary embodiments shown in the drawings.

DETAILED DESCRIPTION

In the following description, identical, functionally identical and functionally related elements can be provided with the same reference signs. Absolute values are only given as examples in the following and are not to be understood as limiting.

Figure 1C:
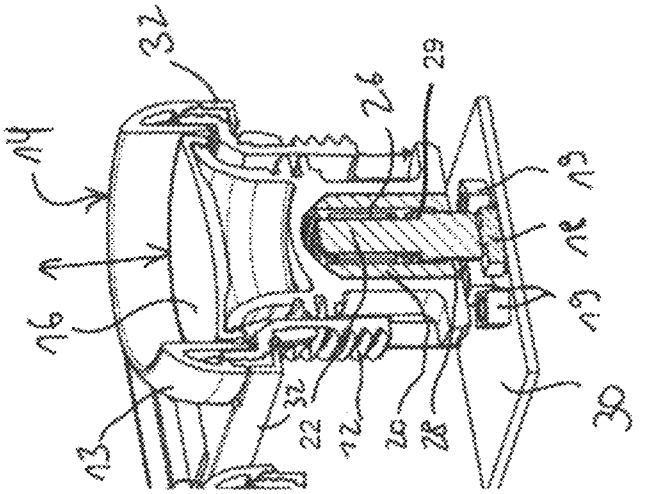
FIG. 1C shows the control and switching device in a constellation of a greater distance of the contact switch than in the constellation of FIG. 1A.
Figure 1A:
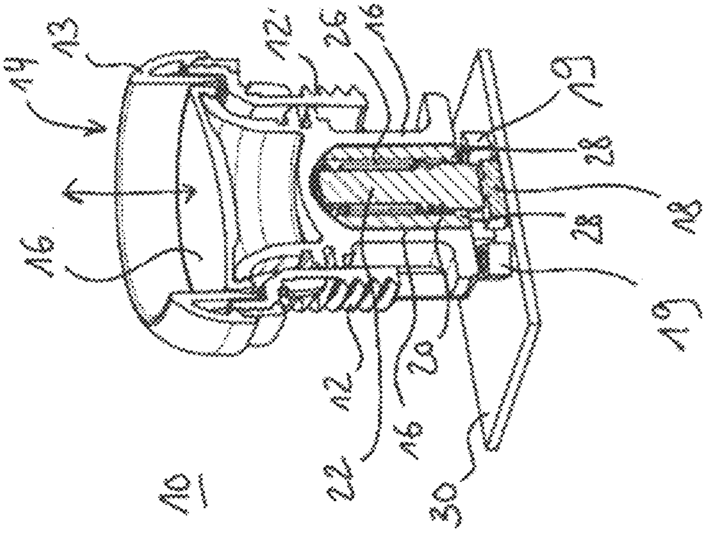
FIG. 1A shows a control and signaling device according to the first embodiment in a pressed-in state.
Figure 1D:
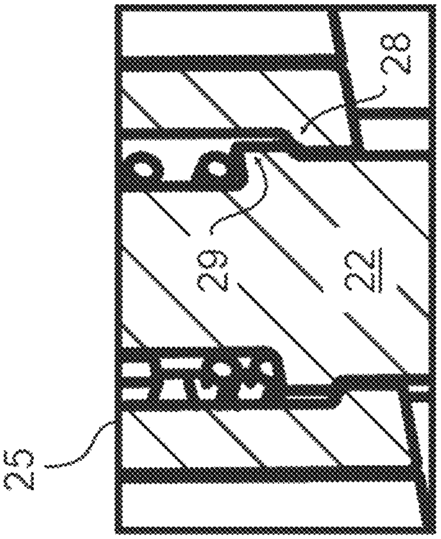
FIG. 1D shows a magnified portion of the control and signaling device according to the first embodiment of FIG. 1B.
Figure 1B:
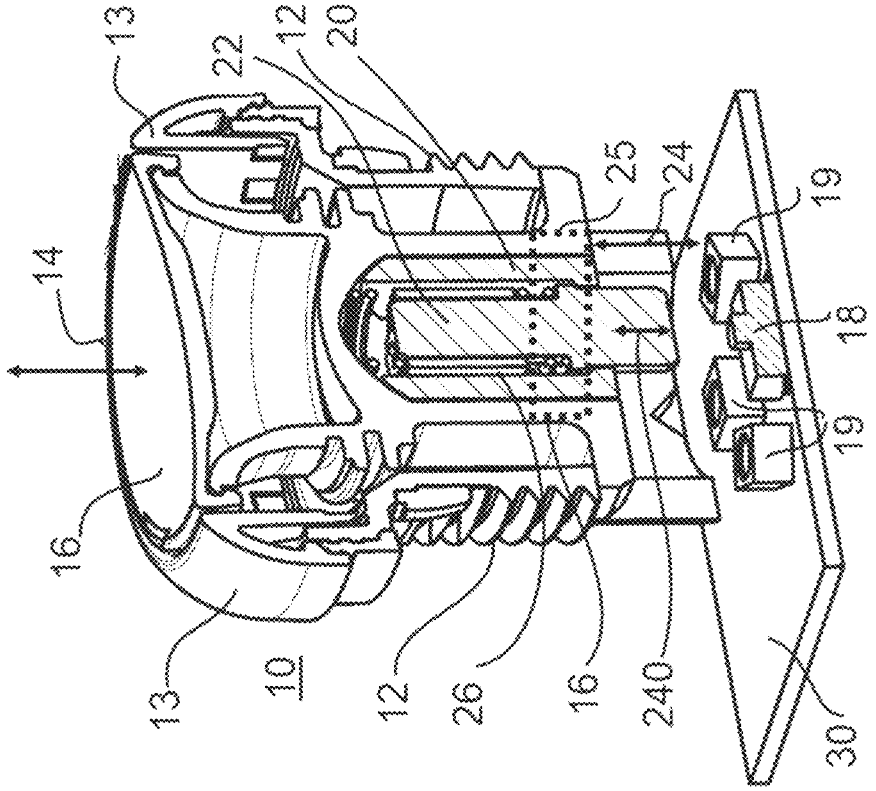
FIG. 1B shows a control and signaling device according to the first embodiment in a basic position.
Figure 2C:
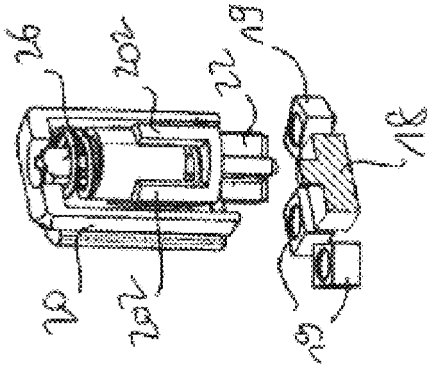
FIG. 2C shows an additional isometric view of an embodiment of an adapter for a control and signaling device.
Figure 2B:
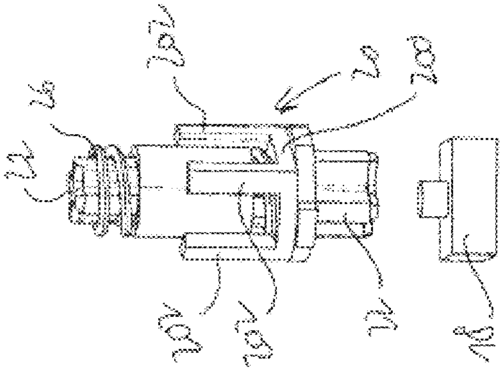
FIG. 2B shows another isometric view of an embodiment of an adapter for a control and signaling device.
Figure 2A:
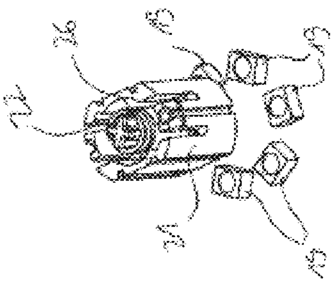
FIG. 2A shows an isometric view of an embodiment of an adapter for a control and signaling device.
Figure 2D:
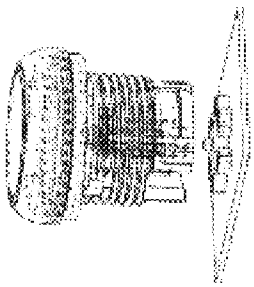
FIG. 2D shows a transparent view of an embodiment of the adapter configured with a control and signaling device.

FIGS. 1A, 1B, and 1C show a control and signaling device 10, configured as a push button, of the RMQ-Titan@ series, which is arranged above a circuit board 30 with a microswitch 18, mounted thereon, as a contact element. The microswitch 18 is surrounded by LEDs (light-emitting diodes) 19 arranged around it on the circuit board 30. If elements of the control and signaling device 10 are transparent to light radiation, the LEDs 19 may signal, for example, things responsible for switching of the control and signaling device 10, via the light radiation emerging in particular from the upper side.

The control and signaling device 10 has a cylindrical main body 12 with an external thread for screwing into a bracket 32 for control and signaling devices. An operating element 14 is inserted at the upper free end of the main body 12. The operating element 14 has a switching part 16 which is axially movable relative to and in the main body 12, as indicated by the double arrow. On its upper side, the switching part 16 has a touch surface for pushing the switching part 16 into the main body 12. The switching part 16 has a cylindrical central section, the diameter of which is smaller than the inner diameter of the main body 12 so that it is axially movable in the main body 12. Axially movable means a longitudinal movement capability along the cylinder axis of the main body 12. By a fixing ring 13, which is fastened to the upper free end of the main body, for example, by means of screws, the switching part 16 is held in the main body 12 in such a way that it cannot fall out or jump out of the main body 12 at the upper end. In FIG. 1B, the switching part 16 is shown in the basic position, i.e., when the microswitch 18 is not activated, while in FIG. 1A, the switching part 16 is shown in the pressed-in state in which the microswitch 18 is activated.

Due to its small dimensions, the microswitch 18 is arranged at a distance from the above-described components of the control and signaling device 10 in such a way that, without additional measures, activation is not possible since the switching path to be bridged for activation of the microswitch 18 is too large and, in addition, the pressure force required for the microswitch 18 cannot be satisfied in some circumstances, i.e., the operating pressure acting on the switching part 16 is not in the force range pre-specified for the microswitch 18. In order to bridge the switching path 24 to the microswitch 18 at least in a portion 240 and to limit the pressure force on the microswitch 18 to a force range which is pre-specified in particular for the activation of the microswitch 18, a multipartite insert element is provided for insertion into the main body 12.

The multipartite insert element has a bracket 20, which is inserted in the lower cylindrical section of the switching part 16 and is fixed therein, i.e., is moved with the switching part 16, as can be seen in FIGS. 1A, 1B, and 1C, where FIG. 1D provides a magnified view of portion 25 of FIG. 1B. For example, the bracket 20 may be fastened, or screwed or glued, in a clamping manner in the switching part 16. A pin-shaped central part 22 is arranged in an axially movable manner within the bracket 20, specifically such that the bracket 20 is arranged coaxially with the central part 22. The elastic element 26 is arranged in particular in the form of a helical compression spring between the bracket 20 and the central part 22. As shown in FIG. 1D, in order to prevent the central part 22 from falling out of the bracket 20, a stop 28 is provided at the lower end of the bracket 20 toward the contact element. The elastic element 26 or the helical compression spring is clamped between a projection 29 of the central part 22 and the upper closed end of the cylindrical section of the switching part 16 and thereby elastically supports the central part 22 in such a way that, in the depressed state of the switching part 16, the pressure force acting on the microswitch 18 via the central part 22 is limited to a force range which corresponds in particular to the force range specified for the microswitch 18 or is comprised thereby.

As can be seen in FIG. 1B, the lower portion of the central part 22 projects far enough from the switching part 16 that a portion 240 of the switching path 24 can be bridged thereby. Thus, the control and signaling device 10 can also be used with microswitches 18 having a relatively low overall height. In the constellation shown in FIG. 1C, the control and signaling device 10 is arranged at a greater distance than in the constellation of the microswitch 18 shown in the left drawing. In this case, the lower portion of the central part 22 projects further from the cylindrical lower section of the switching part 16 in the pressed-in state of the switching part 16. The helical compression spring 26 ensures that the pressure force acting on the microswitch 18 through the central part 22 is within the pre-specified force range. As FIGS. 1A and 1B show, the control and signaling device 10 can be flexibly used in different constellations, that is to say, for example, at different distances from contact elements and also with contact elements having different overall heights.

FIG. 2 shows an embodiment of an insert element with the bracket 20, which has a base 200 in the form of a cylindrical section with an opening in its center through which the pin-shaped central part 22 is guided so that both ends of the central part 22 project from the base 200. Starting from the base 200, finger-shaped retaining rods 202 extend approximately parallel to the central part 22 in order to mount the helical compression spring 26 coaxially between the central part 22 and the retaining rods 202 and to guide the base 200 in the switching part 16. As shown at the top left in the drawing, the bracket 20 may be mounted with the central part 22 and the helical compression spring 26 in an insert part 21 which may be designed for insertion into the main body 12 of the control and signaling device 10. The insert part 21 can be mounted in the main body 12 in an axially movable manner and can, for example, be moved in the direction of the microswitch 18 by pressing the switching part 16 into the main body 12.

Figure 3A:
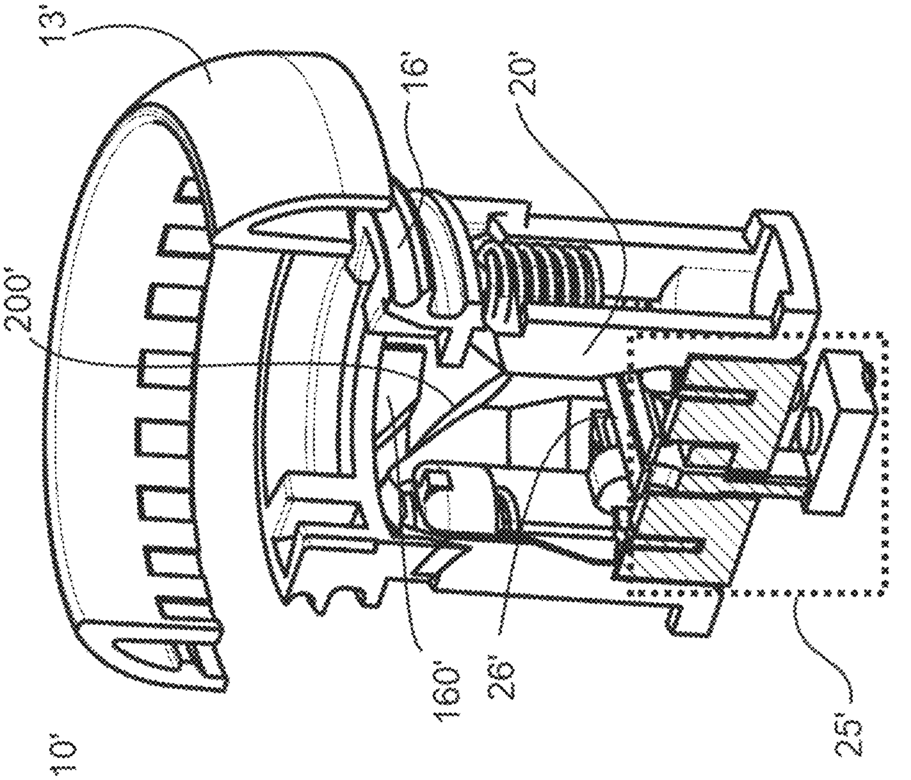
FIG. 3A shows a control and signaling device according to the second embodiment without an operating element.
Figure 3D:
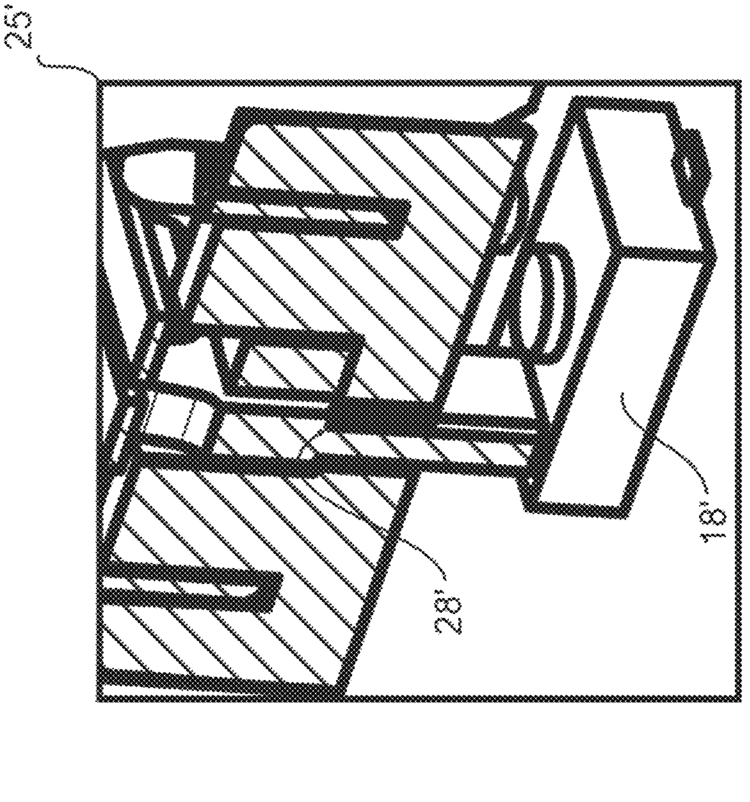
FIG. 3D shows a magnified portion of the control and signaling device according to the second embodiment of FIG. 3A.
Figure 3C:
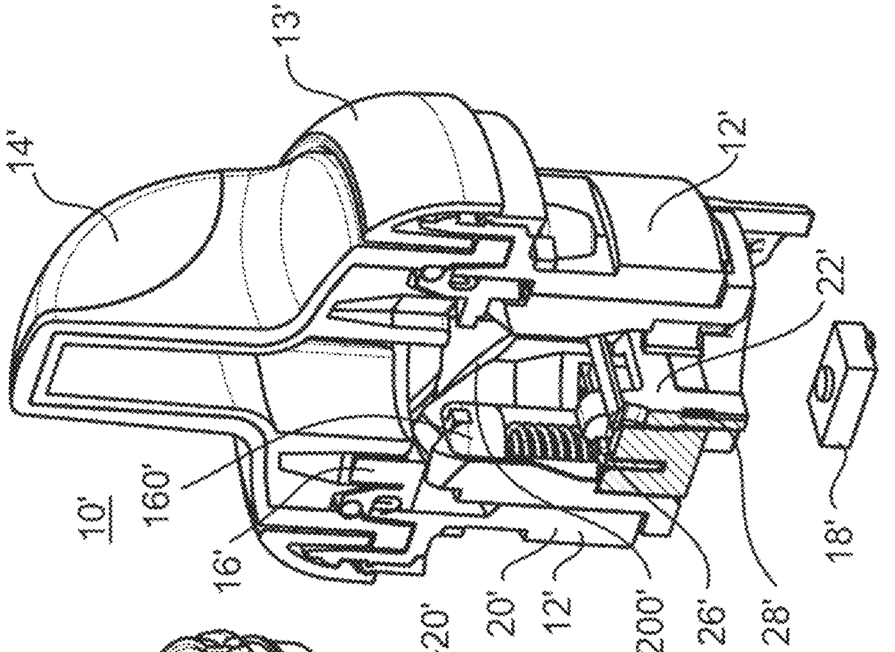
FIG. 3C shows a control and signaling device according to the second embodiment with an operating element inserted.
Figure 3B:
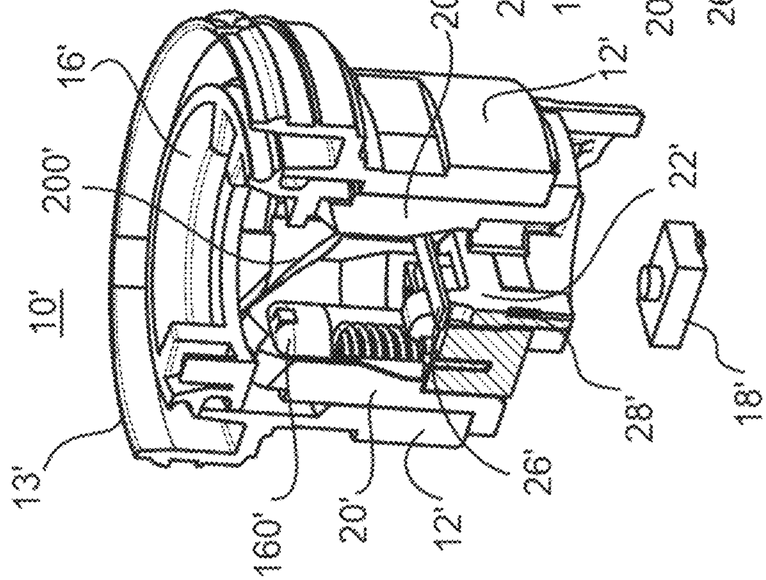
FIG. 3B shows a control and signaling device according to the second embodiment in a different state without an operating element.

FIGS. 3A, 3B, and 3C show a control and signaling device 10', configured as a rotary switch, of the RMQ-Titan@ series, which is arranged above a circuit board with a microswitch 18', mounted thereon, as a contact element. The microswitch 18' (shown in FIG. 3D which provides a magnified view of portion 25'of FIG. 3A) may be surrounded by LEDs arranged around it on the circuit board, similarly to that shown in FIGS. 1A, 1B, and 1C. If elements of the control and signaling device 10' are transparent to light radiation, the LEDs may signal, for example, things responsible for switching of the control and signaling device 10', via the light radiation emerging in particular from the upper side.

The control and signaling device 10' has a cylindrical main body 12' with an external thread for screwing into a bracket for control and signaling devices. At the upper free end of the main body 12', an operating element 14' may be inserted, as shown in FIG. 3C. The operating element 14' has a switching part 16' that is rotationally movable relative to and in the main body 12', as indicated by the double arrow. At its upper side, the switching part 16' has a gripping surface for rotating the switching part 16' in the main body 12'. The switching part 16' has a cylindrical central section the diameter of which is smaller than the inner diameter of the main body 12' so that it is rotationally movable in the main body 12'. Rotationally movable means a rotation capability about the cylinder axis of the main body 12'. By a fixing ring 13', which is fastened to the upper free end of the main body, for example, by means of screws, the switching part 16' is held in the main body 12' in such a way that it cannot fall out or jump out of the main body 12' at the upper end. In FIGS. 3A and 3B, the control and signaling device 10' is shown without the operating element 14', while the control and signaling device 10' is shown with the inserted operating element 14' in FIG. 3C.

Due to its small dimensions, the microswitch 18' is arranged at a distance from the above-described components of the control and signaling device 10' that an activation is not possible without additional measures since the switching path to be bridged for activation of the microswitch 18' is too large and, in addition, the pressure force required for the microswitch 18' cannot be satisfied in some circumstances, i.e., the operating pressure acting on the switching part 16' is not within the force range pre-specified for the microswitch 18'. In order to bridge the switching path to the microswitch 18' at least in a portion and to limit the pressure force on the microswitch 18' to a force range which is pre-specified in particular for the activation of the microswitch 18', a multipartite insert element is provided for insertion into the main body 12'.

The multipartite insert element has a central part 20' which is axially movable relative to the main body 12' by a rotation of the switching part 16' in the main body 12'. The central part 20' also has a pressure part 22' which forms a portion provided for operating the microswitch 18' and is mechanically coupled to the central part 20' in such a way that an axial movement of the central part 20' relative to the main body 12' causes a corresponding axial movement of the pressure part 22'. In this case, the pressure part 22' is pressed against a stop 28' (shown in FIG. 3D) in the direction of the microswitch 18' by an elastic element 26' in the form of a leaf spring fixed to the central part 20'. A rotation of the switching part 16' is converted by the mechanism described below into the axial movement of the central part 20' and pressure part 22': For this purpose, the switching part 16' has a sliding surface 160' which is arranged at a first predetermined angle in relation to the axis of rotation of the switching part 16'. Likewise, the central part 20' has a corresponding mating sliding surface 200' which is arranged at a second predetermined angle in relation to the axis of rotation of the switching part 16', which angle is approximately equal to the first angle, for example approximately 45°. When the switching part 16' rotates, the sliding surface 160' of the switching part 16' slides on the mating sliding surface 200' of the central part 20'. Since the rotating switching part 16' is not axially movable by the fixing ring 13', the central part 20' is moved axially downward, i.e., in the direction of the contact element 18' relative to the main body 12', namely in the main body 12', by the sliding surfaces 160' and 200' sliding on one another. In this way, the pressure part 22' is also moved downward toward the microswitch 18' so that when the central part 20' is moved axially downward to the maximum amount, the pressure part 22' presses on the microswitch 18' such that it can be operated. As a result, the pressure part 22' is pressed against the leaf spring 26', which is bent upward. The pressure force of the leaf spring 26' is dimensioned in such a way that it is approximately in a force range which is pre-specified for the microswitch 18'.

As can be seen in FIGS. 3A, 3B, and 3C, the lower portion of the central part of the pressure part 22' projects far enough from the switching part main body 12' that a portion of the switching path can be bridged thereby. Thus, the control and signaling device 10' may also be used with microswitches 18' having a relatively low overall height. Depending on the arrangement of the sliding surfaces 160', 200', i.e., depending on the angle selection, it is possible to adjust how far the pressure part 22' can be moved out of the main body 12'. For example, when an angle of less than 45° of the sliding surfaces 160', 200' in relation to the axis of the main body 12' is selected, a larger switching path can be bridged than when an angle greater than 45° is selected. The control and signaling device 10' may thus be used flexibly in different constellations, i.e., for example, at different distances from contact elements and also with contact elements having different overall heights.

The invention claimed is:

1. A control and signaling device comprising:

a cylindrical main body with two open ends, an operating element which is designed for insertion into a first one of the open ends of the main body and has a switching part that is movable relative to the main body, and a multipartite insert element which is designed for insertion into the main body for bridging at least one portion of a switching path from the switching part to a contact element arranged at a second one of the open ends and has an elastic element which elastically supports a portion, provided for operating the contact element, of the insert element in such a way that a pressure force of the portion on the contact element is limited to a prespecified force range, wherein the switching part is axially movable relative to the main body, and wherein the insert element has a pin-shaped central part, which forms the portion provided for operating the contact element, and a bracket which is arranged coaxially with the central part and into which the elastic element can be inserted so that the elastic element is arranged coaxially with the central part and can exert a force on the central part, wherein the bracket is fixed in the switching part, and the central part is mounted in the bracket in an axially movable manner and is pressed against a stop in an axial direction of the contact element by the elastic element arranged coaxially between the bracket and the central part.

2. The control and signaling device according to claim 1, wherein the bracket has a base and a plurality of finger-shaped retaining rods extending from the base approximately parallel to the central part, wherein the base has a center and an opening approximately in the center for the central part to pass through, and an edge region of the opening in the base forms a stop for a radial projection of the central part.

3. The control and signaling device according to claim 1, wherein the switching path is approximately 5 mm and, in a state where the central part is pressed up to the stop, the central part projects from the bracket far enough that the switching path is shortened to approximately 1 mm.

4. The control and signaling device according to claim 1, wherein the elastic element is a helical compression spring designed in such a way that a pressure force of the spring in a compressed state is approximately in the prespecified force range.

5. The control and signaling device according to claim 1, wherein the switching part comprises an axially moving portion, and wherein the bracket is fixed to the axially moving portion, and wherein the elastic element has an end disposed at the bracket and another end disposed at the central part.

6. The control and signaling device according to claim 5, wherein the bracket is fixed to the switching part in the axial and radial directions, and the central part is mounted in the bracket in the axially movable manner relative to the main body and to the switching part, such that the central part is fixed in the radial direction, and wherein the elastic element and bracket are configured such that, upon an external depression of the switching part, the elastic element biases the central part into motion in the axial direction toward the contact element.

7. The control and signaling device according to claim 6, wherein the contact element is a microswitch of a circuit board.

8. A control and signaling device comprising:

a cylindrical main body with two open ends;

an operating element which is designed for insertion into one of the open ends of the main body and has a switching part that is movable relative to the main body; and a multipartite insert element, which is designed for insertion into the main body for bridging at least one portion of a switching path from the switching part to a contact element arranged on another of the open ends and has an elastic element, which elastically supports a portion, provided for operating the contact element, of the insert element in such a way that a pressure force of the portion on the contact element is limited to a prespecified force range, wherein the switching part is rotationally movable relative to the main body, and wherein the insert element has a central part, which is axially movable relative to the main body by a rotation of the switching part in the main body, and a pressure part, which forms the portion provided for operating the contact element and is mechanically coupled to the central part in such a way that an axial movement of the central part relative to the main body causes a corresponding axial movement of the pressure part, and wherein the pressure part is pressed against a stop in an axial direction of the contact element by the elastic element fixed to the central part.

9. The control and signaling device according to claim 8, wherein the switching part has a sliding surface with a predetermined angle in relation to the axis of rotation of the switching part and the central part has a corresponding mating sliding surface, as a result of which the sliding surface slides on the mating sliding surface during a rotation of the switching part and thereby causes the axial movement of the central part relative to the main body.

10. The control and signaling device according to claim 8, wherein the switching path is approximately 5 mm and, in the state where the pressure part is pressed up to the stop, the pressure part projects beyond the another of the open ends of the main body far enough that the switching path is shortened to approximately 1 mm.

11. The control and signaling device according to claim 8, wherein the elastic element is a leaf spring designed in such a way that a pressure force of the spring in a bent state is approximately in the prespecified force range.

* * * * *